US005574355A

United States Patent [19]
McShane et al.

[11] Patent Number: 5,574,355
[45] Date of Patent: Nov. 12, 1996

[54] METHOD AND APPARATUS FOR DETECTION AND CONTROL OF THERMAL RUNAWAY IN A BATTERY UNDER CHARGE

[75] Inventors: Stephen J. McShane, Oak Brook; Mark Hlavac, New Lenox; Kevin Bertness, Batavia, all of Ill.

[73] Assignee: Midtronics, Inc., Burr Ridge, Ill.

[21] Appl. No.: 406,210

[22] Filed: Mar. 17, 1995

[51] Int. Cl.⁶ .................. H01M 10/44; H01M 10/48; H02J 7/04; G01N 27/416

[52] U.S. Cl. .................. 320/39; 320/48; 320/51; 324/430

[58] Field of Search .................. 320/39, 51, 48; 324/430, 431

[56] References Cited

U.S. PATENT DOCUMENTS

| | | | |
|---|---|---|---|
| 3,873,911 | 3/1975 | Champlin | 324/29.5 |
| 3,909,708 | 9/1975 | Champlin | 324/29.5 |
| 4,114,083 | 9/1978 | Benham et al. | 320/39 |
| 4,322,685 | 3/1982 | Frailing et al. | 324/429 |
| 4,816,768 | 3/1989 | Champlin | 324/428 |
| 4,825,170 | 4/1989 | Champlin | 324/436 |
| 4,881,038 | 11/1989 | Champlin | 324/426 |
| 4,912,416 | 3/1990 | Champlin | 324/430 |
| 4,947,124 | 8/1990 | Hauser | 324/430 |
| 4,956,597 | 9/1990 | Heavey et al. | 320/39 X |
| 5,140,269 | 8/1992 | Champlin | 324/48 X |
| 5,204,611 | 4/1993 | Nor et al. | 320/21 |
| 5,214,370 | 5/1993 | Harm et al. | 320/35 |
| 5,281,919 | 1/1994 | Palanisamy | 324/430 X |
| 5,281,920 | 1/1994 | Wurst | 324/430 |
| 5,365,453 | 11/1994 | Startup et al. | 320/48 X |
| 5,457,377 | 10/1995 | Johsson | 320/48 X |

*Primary Examiner*—Peter S. Wong
*Assistant Examiner*—K. Shin
*Attorney, Agent, or Firm*—Westman, Champlin & Kelly, P.A.

[57] ABSTRACT

A thermal runaway detection apparatus is provided for use during charging of a battery. The thermal runaway detection apparatus includes circuitry for determining internal resistance (impedance) or conductance (admittance) of the battery under charge. Detection circuitry detects an increase in internal battery conductance or a decrease in internal battery resistance and provides an output. The output is indicative of a thermal runaway condition in the battery. The circuitry can be used to provide feedback which controls charging of the battery.

20 Claims, 4 Drawing Sheets

METHOD AND APPARATUS FOR DETECTION AND CONTROL OF THERMAL RUNAWAY IN A BATTERY UNDER CHARGE

BACKGROUND OF THE INVENTION

The present invention relates to monitoring storage batteries during charging. More specifically, the present invention relates to detection of a thermal runaway condition during charging of storage batteries.

Thermal runaway is becoming an increasingly important concern in the battery industry. Thermal runaway may be one of the most predominant concerns for many users with valve regulated lead acid (VRLA) batteries which are commonly used in telecommunications, electric utilities, railroad signals and communications, uninterruptible power systems, emergency power and military systems. Unlike a common flooded battery, VRLA batteries are much less tolerant to abusive conditions. However, frequently little consideration is given to the VRLA battery's physical arrangement, ventilation, cooling and charging characteristics.

There has been a significant increase in thermal runaway incidents in recent years, for example in the telecommunications industry. The result has been decreased reliability of telecommunication service, loss of equipment from fire or explosion, danger to persons and premature loss of capacity of the batteries which ultimately requires costly replacement. Significant consideration has been given to temperature feedback control of the charging system voltage and measurement of float currents. Such a technique is described in U.S. Pat. No. 5,214,370, issued May 25, 1993, to Harm et al and entitled BATTERY CHARGER WITH THERMAL RUNAWAY PROTECTION. However, these techniques have not provided a monitoring system of sufficient accuracy to control thermal runaway in actual applications.

Unlike a flooded battery, VRLA batteries are sealed, and access to the interior of the battery for temperature measurements is impossible. Therefore, temperature measurements have been limited to external temperature sensing which introduces a thermal lag time. This lag time is too long to accurately control charging in the event of a thermal runaway condition. An additional problem is simply deciding where to position an external temperature sensor because many of the VRLA batteries used in industrial applications are packaged in multiple cell monoblock containers.

Another technique to detect thermal runaway is to monitor the ambient temperature in close proximity to the battery under charge. Another technique includes monitoring both ambient temperature and the external temperature of the battery to detect thermal runaway. However, these techniques do little to overcome the thermal lag problem described above.

U.S. Pat. No. 4,114,083, issued Sep. 12, 1978, to Benham et al, entitled BATTERY THERMAL RUNAWAY MONITOR, describes another technique which attempts to prevent thermal runaway. The Benham et al reference describes monitoring a nickel-cadmium battery which is being charged by a constant 24 volt source in an aircraft. The system monitors charging current. Upon detection of an increase in charging current over time, the system predicts that the battery has entered a thermal runaway condition such that charging can be halted. However, this system suffers from a number of drawbacks. For example, charging current may increase with time due to conditions other than thermal runaway, such as when the battery is discharged and is capable of accepting a high charging rate. Additionally, the added charging current due to thermal runaway in a single battery in a series of batteries is relatively small and difficult to detect.

From the foregoing discussion, it can be seen that the art lacks an accurate technique which is capable of predicting the onset of thermal runaway and responsibly controlling the battery charger.

SUMMARY OF THE INVENTION

A method of detecting thermal runaway during charging of a storage battery is described. In one embodiment, a current signal is injected through the battery terminals and the resulting voltage signal is monitored. A decrease in the monitored voltage signal is detected and is indicative of a thermal runaway condition. Upon detection of a thermal runaway condition, the charging is reduced. In another embodiment, a voltage signal is applied to the two terminals of the storage battery and the resulting current signal flowing therethrough is monitored. An increase in current flowing therethrough is detected and is indicative of a thermal runaway condition. This detection is used to reduce charging.

An apparatus for sensing thermal runaway in a battery under charge includes sense circuitry for sensing a voltage signal between two terminals of the battery developed in response to a known current signal flowing therethrough. Detection circuitry coupled to the sense circuitry detects a decrease in the sensed voltage signal over time which is indicative of a thermal runaway condition in the battery under charge. Output circuitry coupled to the detection circuitry provides an output upon detection of a thermal runaway condition. The output is used to provide an alarm or to control the charge supplied by the battery charger. In another embodiment, sense circuitry senses a current signal flowing through the battery which is developed in response to a voltage signal applied to two terminals of the battery. Detection circuitry coupled to the sense circuitry detects an increase in current signal flowing through the battery over time which is indicative of a thermal runaway condition.

BRIEF DESCRIPTION OF THE DRAWINGS

FIG. 3 is a simplified block diagram of another embodiment of thermal detection circuitry.

DETAILED DESCRIPTION OF THE PREFERRED EMBODIMENTS

We have discovered that there is a direct relationship between battery conductance and admittance (and an indirect relationship between battery impedance or resistance) and internal battery temperature. Thus, by monitoring battery conductance or impedance, the onset of thermal runaway can be detected and used to control charging of the battery to prevent a thermal runaway condition from developing. This technique does not suffer from the thermal lag problem of the prior art described above.

Figure 1:
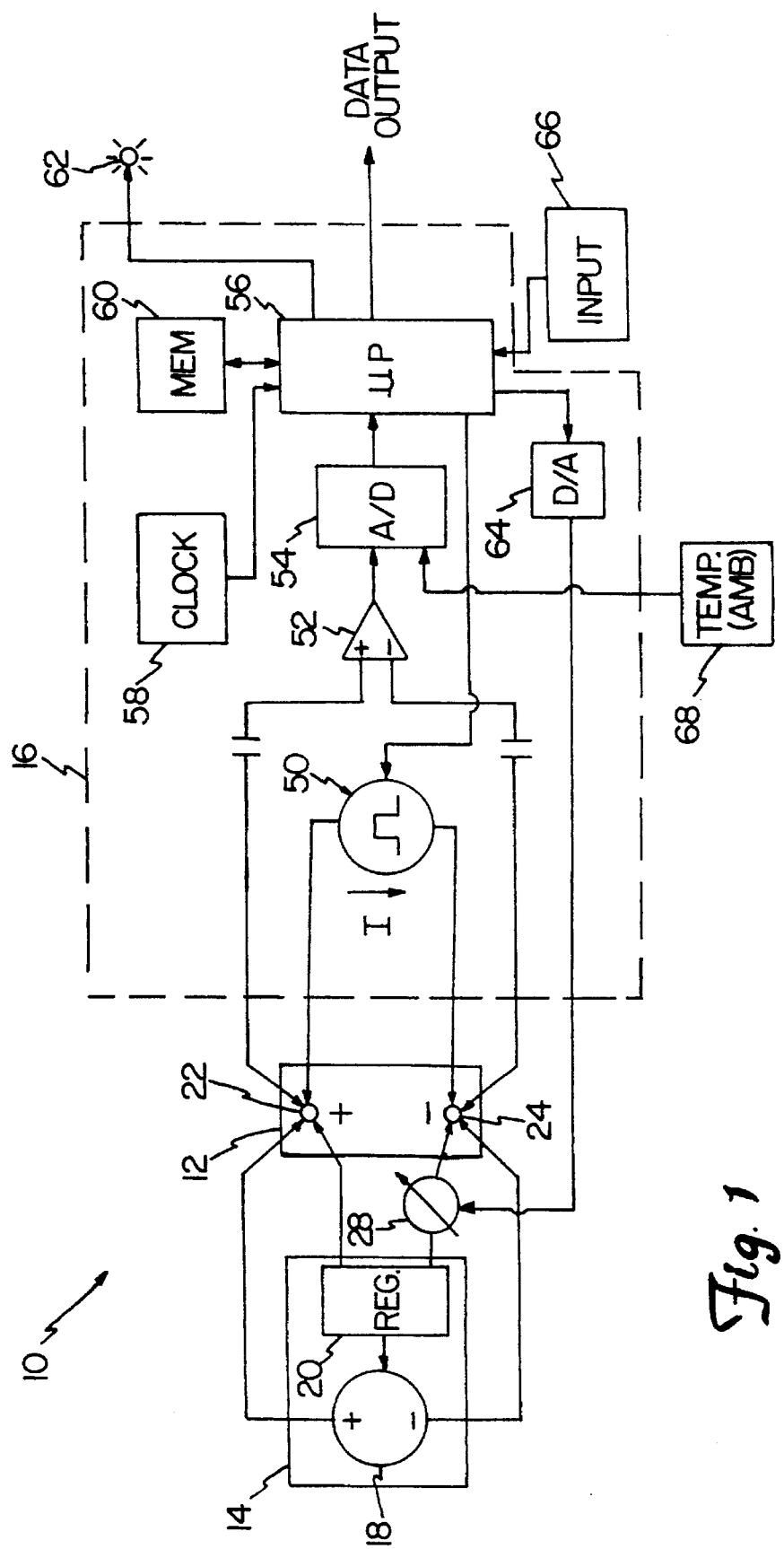
FIG. 1 is simplified block diagram showing battery charging circuitry and thermal runaway detection circuitry in accordance with the present invention.

FIG. 1 is a simplified block diagram of a battery charging system 10 in accordance with the invention. Battery charging system 10 includes battery 12, battery charger 14 and thermal runaway detection circuitry 16. Battery charging circuit 14 includes dc voltage source 18 and regulator 20. A positive side of voltage source 18 is connected to a positive terminal 22 of battery 12, and a negative side of voltage source 18 is connected to a negative terminal 24 of battery 12. Regulator 20 measures the voltage between terminals 22 and 24 of battery 12 and controls the voltage of voltage source 18 to maintain a predetermined voltage difference between terminals 22 and 24. Normally, this operates to charge battery 12 at a constant voltage. As battery 12 is normally charged, the charging current regulator 20 decreases with time thus reducing the charging energy delivered to battery 12.

Under thermal runaway conditions, however, the charging current could increase with time. Accordingly, variable voltage source 28 is connected between regulator 20 and battery 12 to introduce an offset voltage in the voltage sensed by regulator 20. Voltage source 28 is controlled by thermal runaway detection circuitry 16. By increasing the apparent voltage observed by regulator 20 between terminals 22 and 24, voltage source 28 can be used to regulate voltage source 18 and thus reduce the charge applied to battery 12 upon detection of an impending thermal runaway condition.

Figure 2:
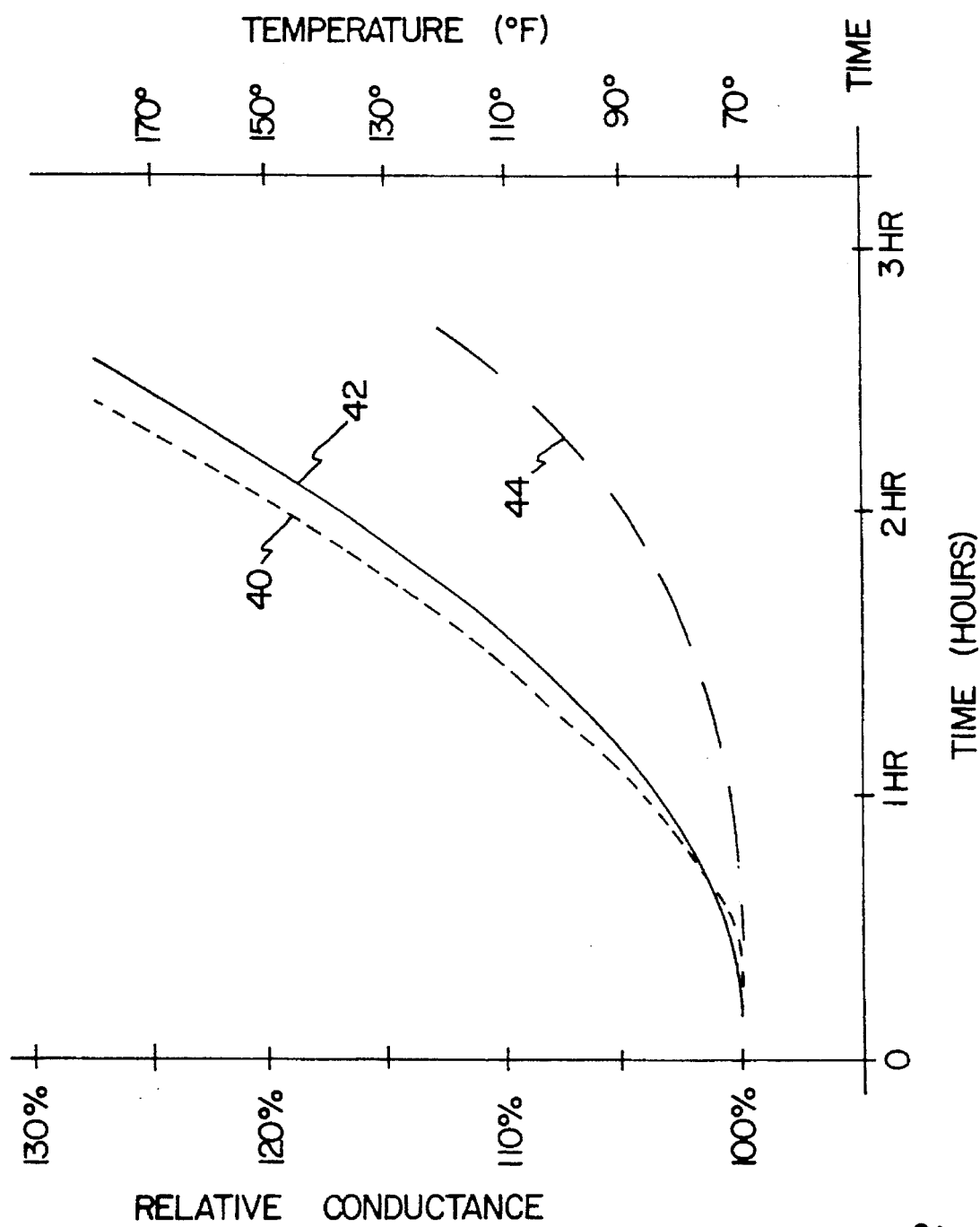
FIG. 2 is a graph showing a relationship between battery temperature and relative battery conductance.
Figure 9:
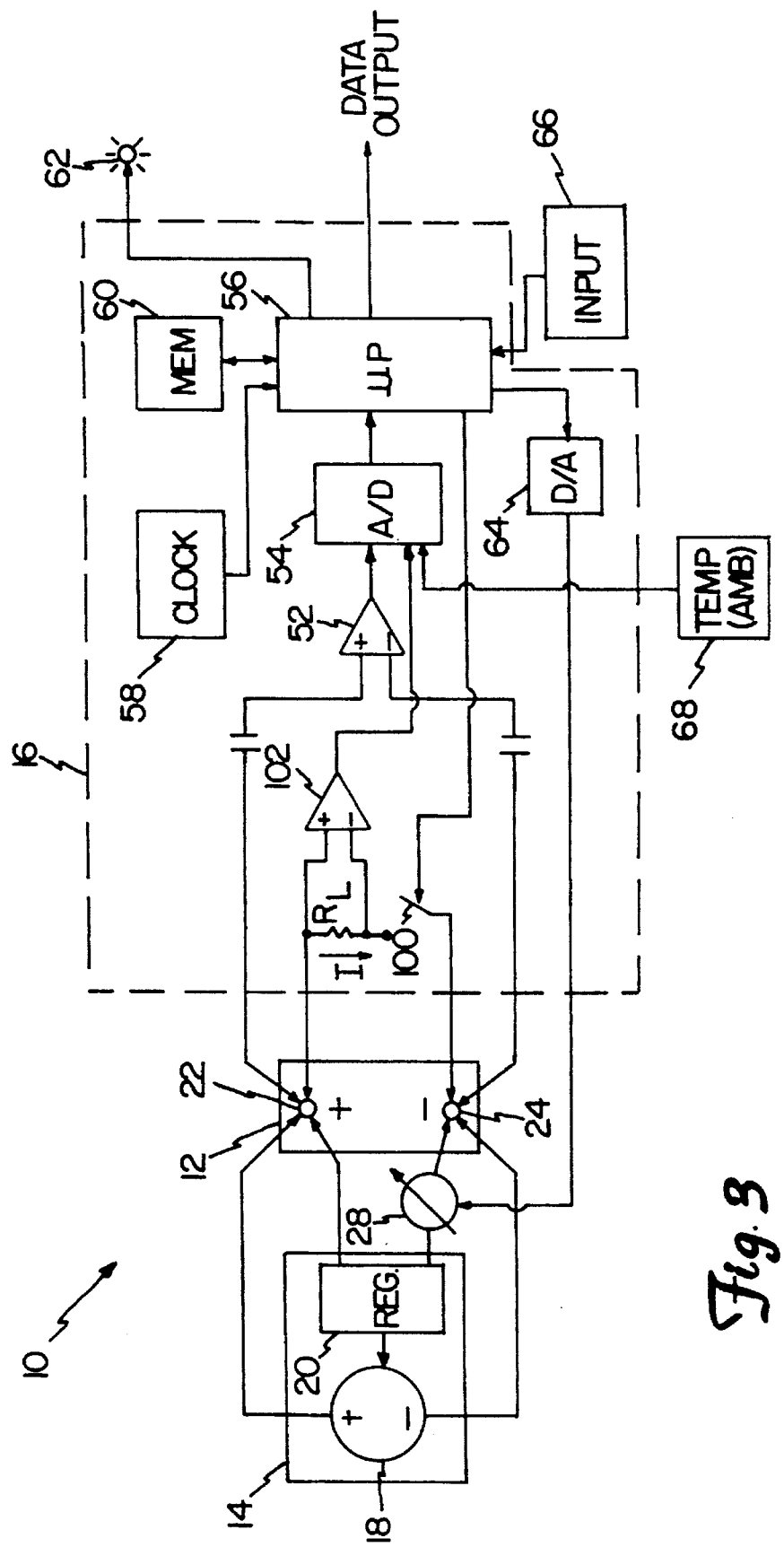

FIG. 2 is a graph which shows the relationship between battery conductance and internal battery temperature over time. Curve 40 is a graph of the actual internal temperature in Fahrenheit of a battery undergoing charging over time. As shown in FIG. 2, the internal battery temperature is initially at the ambient temperature and rises over time during charge. Graph 42 is a graph of relative battery conductance versus time of the same battery as in graph 40. Relative conductance is calculated as the ratio of a measured conductance to a predetermined standard. In one application, a relative conductance of 100% indicates a fully charged battery.

As indicated in FIG. 2, relative conductance (40) has a direct relationship with internal battery temperature (40). In contrast, graph 44 is a graph of external battery temperature in Fahrenheit versus time. There is a significant thermal lag time which introduces a temperature differential between the internal battery temperature (40) and the external battery temperature (44).

Referring back to FIG. 1, circuitry 16 determines the battery conductance of a battery under charge. Circuitry 16 includes current source 50, differential amplifier 52, analog-to-digital converter 54 and microprocessor 56. Amplifier 52 is capacitively coupled to battery 12 through capacitance C1 and C2, and has an output connected to an input of analog-to-digital converter 54. A/D converter 54 is also connected to ambient temperature sensor 68. Microprocessor 56 is connected to system clock 58, memory 60, warning indicator 62 and digital-to-analog converter 64. The output of digital-to-analog converter 64 controls variable voltage source 28. Microprocessor 56 is also capable of receiving an input from input device 66 and ambient temperature from sensor 68.

In operation, current source 50 is controlled by microprocessor 56 and provides a current in the direction shown by the arrow in the figure. In one embodiment, this is a square wave or a pulse. Differential amplifier 52 is connected to terminals 22 and 24 of battery 12 and provides an output related to the voltage difference between these terminals. Amplifier 52 has a high input impedance. Note that circuitry 16 is connected to battery 12 through a four-point connection technique known as a Kelvin connection. Because very little current flows through amplifier 52, the voltage drop through its connections to battery 12 is insignificant. The output of differential amplifier 52 is converted to a digital format and provided to microprocessor 56. Microprocessor 56 operates at a frequency determined by system clock 58 according to program instructions stored in memory 60.

Microprocessor 56 determines the conductance of battery 12 by applying a current pulse with current source 50. The microprocessor determines the change in battery voltage due to the current pulse using amplifier 52 and analog-to-digital converter 54. The value of current I generated by current source 50 is known and stored in memory 60. Microprocessor 56 calculates the conductance of battery 12 as follows:

$$\text{Conductance} = G = \frac{\Delta I}{\Delta V} \qquad \text{Equation 1}$$

where $\Delta I$ is the change in current flowing through battery 12 due to current source 50, and $\Delta V$ is the change in battery voltage due to applied current $\Delta I$. The relative conductance of battery 12, as discussed with respect to FIG. 2, is calculated using the equation:

$$\text{Relative Conductance (\%)} = \frac{G_{measured}}{G_{reference}} \times 100 \qquad \text{Equation 2}$$

where $G_{measured}$ is the battery conductance in accordance with Equation 1 and $G_{reference}$ is a reference conductance value stored in memory 60. Generally, this reference conductance is determined based upon the type and characteristics of battery 12. Microprocessor 56 can also operate using impedance measurements by inverting Equations 1 and 2. This provides an inverse relationship between the measured battery parameter (impedance) and internal battery temperature.

Microprocessor 56 continually monitors relative conductance in accordance with Equations 1 and 2. Microprocessor 56 is capable of detecting the onset of thermal runaway by a number of different techniques. For example, if absolute or relative conductance/impedance exceeds a threshold, if rate of change in conductance/impedance exceeds a threshold or a relation between ambient temperature (as measured with sensor 68) and battery conductance/impedance.

Upon detection of a thermal runaway condition, microprocessor 56 provides a warning output to indicator 62. Indicator 62 may comprise some type of an alarm to inform an operator or a technician of the detected onset of thermal runaway. Additionally, microprocessor 56 controls battery charger 14 to reduce charging and thus inhibit thermal runaway. Microprocessor 56 controls variable voltage source 28 through digital-to-analog converter 64. Digital-to-analog converter 64 provides an analog output to voltage source 28 which responsively adjusts its voltage output. By increasing the voltage provided by voltage source 28, regulator 20 of battery charger 14 senses an increased voltage at its inputs. This causes regulator 20 to reduce the charging voltage of source 18 provided to battery 12. This reduction in charging voltage reduces the power consumption of battery 12 and hence the thermal runaway condition is inhibited. When thermal runaway has been satisfactorily inhibited, as detected by microprocessor 56 by measuring relative battery conductance, microprocessor 56 reduces the voltage of voltage source 28 such that normal charging is resumed. In another embodiment, microprocessor 56 completely stops the charging of charger 14. Data relating to thermal runaway conditions can be stored to memory 64 for subsequent output. For example, the frequency and duration of thermal runaway conditions can be useful in determining the condition of battery 12 and whether it should be replaced. This information is provided on a data output from microprocessor 56. Input 66 provides an input to control or reprogram microprocessor 56.

FIG. 3 shows another embodiment of the invention. FIG. 3 is similar to FIG. 1 and reference numbers have been left the same to the extent possible. In the embodiment of FIG. 3, circuitry 16 includes a load resistance $R_L$ connected to switch 100 between terminals 22 and 24 of battery 12. Switch 100 is controlled by microprocessor 56. A differential amplifier 102 has inputs connected across resistor $R_L$ to measure the voltage drop therebetween. The output of differential amplifier 102 is provided to analog-to-digital converter 54. In operation, microprocessor 56 connects resistor $R_L$ across battery 12 for 200 μsec using switch 100. The voltage across terminals 22 and 24 ($V_1$) is measured using differential amplifier 52 and analog-to-digital converter 54 just prior to connecting load resistor $R_L$. Just prior to disconnecting load resistor $R_L$, a second voltage measurement is taken between terminals 22 and 24 ($V_2$). At approximately the same time, the voltage drop across resistor $R_L$ ($V_{RL}$) is obtain using differential amplifier 102 and analog-to-digital converter 54. Using these data points, microprocessor 56 calculates conductance (or impedance if Equation 3 is inverted) using the formula:

$$G = \frac{V_{RL}/R_L}{V_2 - V_1} \qquad \text{Equation 3}$$

In one embodiment, this measurement is repeated and an average is obtained. In one embodiment, voltages are stored using sample-and-hold circuits and the voltage difference $V_2-V_1$ is obtained using analog techniques.

Figure 4:
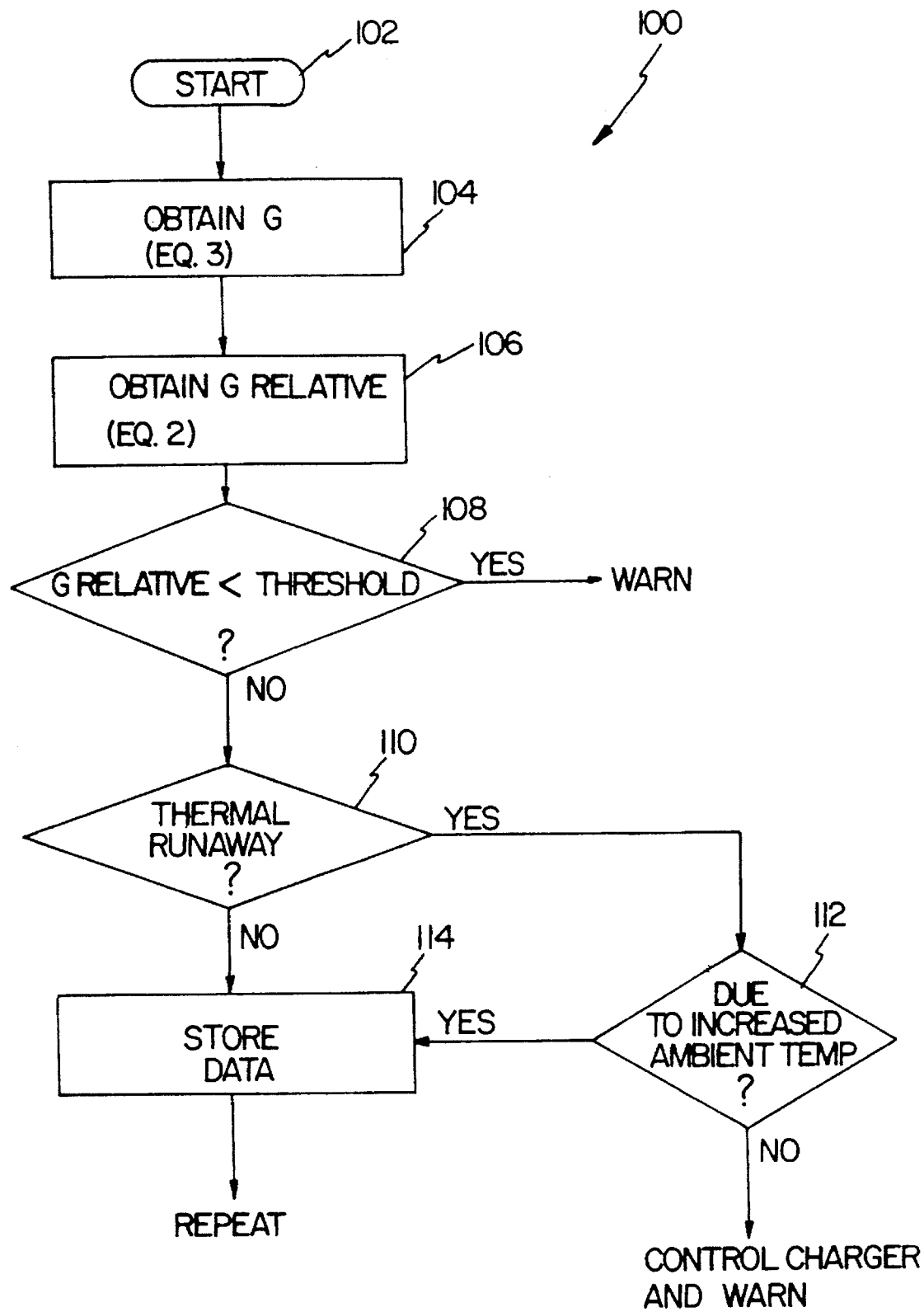
FIG. 4 is a simplified flow chart in accordance with one embodiment of the invention.

FIG. 4 is a simplified flow chart 100 showing steps performed by microprocessor 56 in accordance with one embodiment. Microprocessor 56 starts operation at block 102 and obtains conductance at block 104. Conductance (G) is obtained using any of the steps described herein. Next, relative conductance is obtained using Equation 2 at step 106. At block 108, microprocessor 56 compares the relative conductance of battery 12 to a minimum threshold stored in memory 60. This is a state-of-health check and allows microprocessor 56 to check the health of battery 12 relative to predetermined standards. If the relative conductance is less than the threshold, microprocessor 56 provides a warning output which can be used to alert an operator of a bad battery. If battery 12 passes the state-of-health check, a thermal runaway check is performed in accordance with a the invention at block 110. This thermal runaway detection can be through any of the techniques described herein in which the measured conductance or relative conductance of battery 12 is used to detect a thermal runaway condition. If a thermal runaway is detected, program flow is directed to block 112 in which the ambient temperature is measured using sensor 68. This is an optional check which allows microprocessor 56 to determine whether an increase in battery temperature is due to thermal runaway or simply increasing ambient temperature. For example, if microprocessor 56 detects an increase in ambient temperature, an increase in battery temperature should be forthcoming and delayed due to thermal lag. If, at block 112, microprocessor 56 determines that the detected thermal runaway condition was accurate, microprocessor 56 controls charger 14 and provides a warning output. However, if the detected thermal runaway was a false alarm, program control moves to block 114 where microprocessor 56 stores data in memory 16. The stored data may include ambient temperature, conductance, relative conductance and time of measurement information. This information can be used to detect trends in the measured parameters or saved for future analysis by an operator. After storing data, microprocessor 56 repeats the steps beginning at block 104.

Although circuitry 16 has been illustrated in which source 50 is a current source signal and amplifier 52 measures voltage signal, those skilled in the art will recognize that the circuitry may be modified by using a voltage signal source and detecting the resultant current signal flowing through the battery. A value related to this current level is digitized and provided to microprocessor 56. Battery conductance and relative conductance are calculated using Equations 1 and 2 described above. However, in this embodiment, the value of the voltage signal may be a known value stored in memory 60. Alternative, it may be measured and a digital representation thereof input to microprocessor 56. Further, the voltage or current signal sources can provide a pulsed signal, a square wave, a sine wave, or any appropriate signal under the control of microprocessor 56. Microprocessor 56 need only discern the resultant voltage/current signal due to the current/voltage signal applied.

Further, other techniques for measuring battery conductance are within the scope of the present invention. For example, U.S. Pat. No. 3,873,911, issued Mar. 25, 1975, to Champlin, entitled ELECTRONIC BATTERY TESTING DEVICE; U.S. Pat. No. 3,909,708, issued Sep. 30, 1975, to Champlin, entitled ELECTRONIC BATTERY TESTING DEVICE; U.S. Pat. No. 4,816,768, issued Mar. 28, 1989, to Champlin, entitled ELECTRONIC BATTERY TESTING DEVICE; U.S. Pat. No. 4,825,170, issued Apr. 25, 1989, to Champlin, entitled ELECTRONIC BATTERY TESTING DEVICE WITH AUTOMATIC VOLTAGE SCALING; U.S. Pat. No. 4,881,038, issued Nov. 14, 1989, to Champlin, entitled ELECTRONIC BATTERY TESTING DEVICE WITH AUTOMATIC VOLTAGE SCALING TO DETERMINE DYNAMIC CONDUCTANCE; U.S. Pat. No. 4,912,416, issued Mar. 27, 1990, to Champlin, entitled ELECTRONIC BATTERY TESTING DEVICE WITH STATE-OF-CHARGE COMPENSATION; U.S. Pat. No. 5,140,269, issued Aug. 18, 1992, to Champlin, entitled ELECTRONIC TESTER FOR ASSESSING BATTERY/CELL CAPACITY; and U.S. Pat. No. 4,322,685, issued Mar. 30, 1982, entitled AUTOMATIC BATTERY ANALYZER INCLUDING APPARATUS FOR DETERMINING PRESENCE OF SINGLE BAD CELL.

The terms "inject" or "apply" as used herein describe applying a voltage or current either with active circuitry or by applying a load to the battery. Further, "time varying" includes step input signals, pulsed signals, periodic signals, etc.

Although the present invention has been described with reference to preferred embodiments, workers skilled in the art will recognize that changes may be made in form and detail without departing from the spirit and scope of the invention.

What is claimed is:

1. A method controlling charging of a battery, comprising the steps of:

charging the battery through a first battery terminal and a second battery terminal;

injecting a time varying current through the first and second battery terminals;

monitoring a voltage between the first and second battery terminals generated in response to the known current;

detecting a decrease in the monitored voltage indicative of a thermal runaway condition; and reducing the charging of the battery in response to a detected decrease in the monitored voltage.

2. The method of claim 1 wherein the time varying current comprises a current pulse.

3. The method of claim 1 including measuring ambient temperature and responsively altering the step of detecting a decrease in monitored voltage to determine a thermal runaway condition.

4. A method of controlling charging of a battery, comprising the steps of:

charging a battery through a first battery terminal and a second battery terminal;

applying a time varying signal voltage between the first and second battery terminals;

monitoring a current flowing through the first and second battery terminals generated in response to the known voltage;

detecting an increase in the monitored current indicative of a thermal runaway condition; and reducing the charging of the battery in response to a detected increase in the monitored current.

5. The method of claim 4 wherein the time varying voltage comprises a voltage pulse.

6. The method of claim 4 including measuring ambient temperature and responsively altering the step of detecting an increase in monitored voltage.

7. A method of detecting thermal runaway in a battery under charge, comprising:

a) determining a first conductance of the battery at a first time;

b) determining a second conductance of the battery at a second time;

c) comparing the first and second conductances of the battery;

d) detecting an increase in battery conductance over time based upon the step of comparing, and responsively providing an output indicative of a thermal runaway condition in the battery; and e) repeating steps a through d.

8. The method of claim 7 including comparing a battery conductance measurement to a minimum threshold and providing an output indicative of battery condition.

9. The method of claim 7 including controlling charging of the battery in response to detection of a thermal runaway condition.

10. An apparatus for sensing thermal runaway in a battery under charge, comprising:

a time varying current source coupled to the battery for providing a current therethrough;

sense circuitry for sensing a voltage between two terminals of the battery developed in response to the current flowing therethrough;

detection circuitry coupled to the sense circuitry for detecting a decrease in sensed voltage over time indicative of a thermal runaway condition in the battery under charge; and output circuitry coupled to the detection circuitry providing an output upon detection of a thermal runaway condition in the battery under charge.

11. The apparatus of claim 10 wherein the time varying current source comprises a load.

12. The apparatus of claim 10 including measuring current due to the time varying current source.

13. The apparatus of claim 10 wherein the detector circuitry monitors a ratio of the time varying current and the sensed voltage.

14. The apparatus of claim 13 including monitoring condition of the battery based upon the ratio.

15. The apparatus of claim 10 including an ambient temperature sensor.

16. The apparatus of claim 10 including control circuitry for controlling charging of the battery in response to the output from the output circuitry.

17. An apparatus for sensing thermal runaway in a battery under charge, comprising:

a time varying voltage source for applying a time varying voltage between two terminals of the battery;

sense circuitry for sensing a current flowing through the battery developed in response to the time varying voltage applied thereto;

detection circuitry coupled to the sense circuitry for detecting an increase in sensed current over time indicative of a thermal runaway condition in the battery under charge; and output circuitry coupled to the detection circuitry providing an output upon detection of a thermal runaway condition in the battery under charge.

18. The apparatus of claim 17 including measuring the time varying voltage.

19. The apparatus of claim 17 wherein the detector circuitry monitors a ratio of the time varying voltage sensed current.

20. The apparatus of claim 19 including monitoring condition of the battery based upon the ratio.

* * * * *